J. J. SCULLY.
STOP MECHANISM.
APPLICATION FILED MAY 28, 1918. RENEWED JUNE 26, 1922.

1,430,569. Patented Oct. 3, 1922.
2 SHEETS—SHEET 1.

Inventor
John J. Scully
By Mauro, Cameron, Lewis
& Massie,
Attorneys

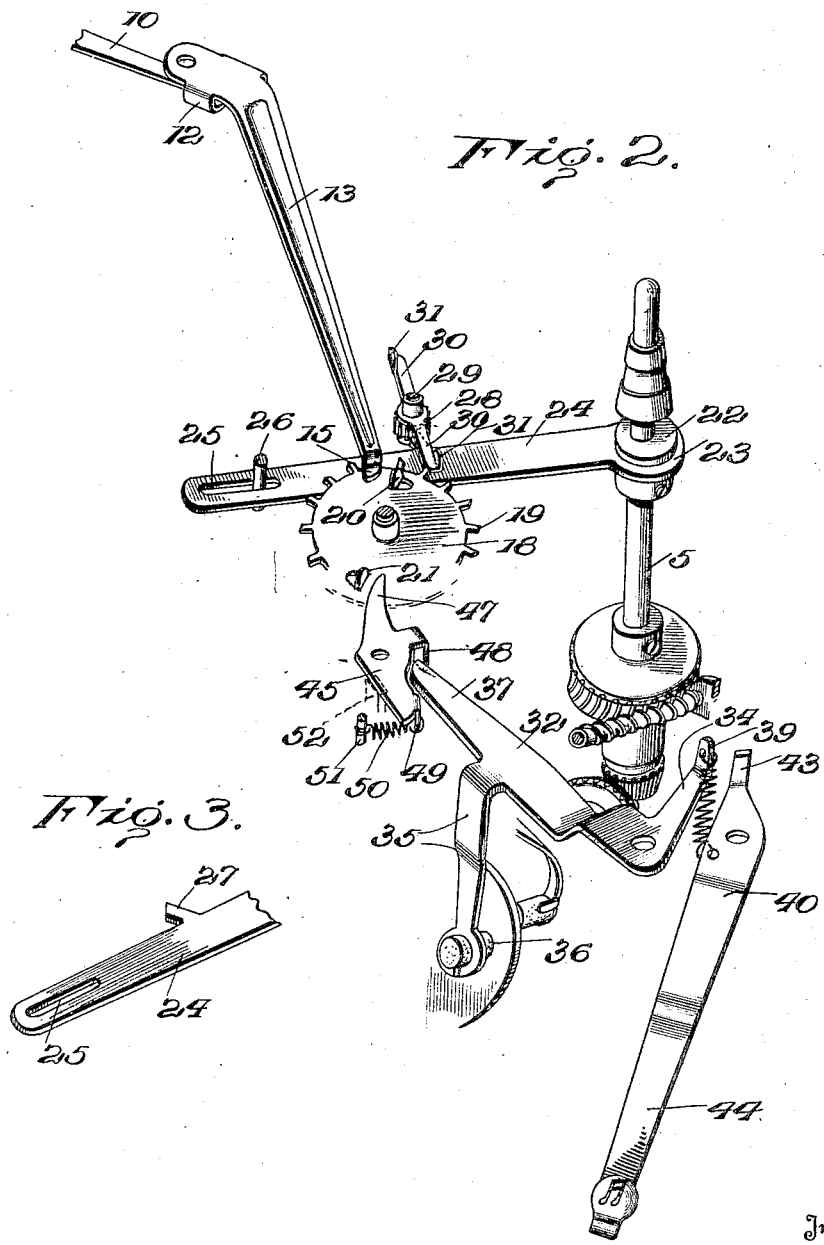

Patented Oct. 3, 1922.

1,430,569

UNITED STATES PATENT OFFICE.

JOHN J. SCULLY, OF BRIDGEPORT, CONNECTICUT, ASSIGNOR TO COLUMBIA GRAPHOPHONE MANUFACTURING COMPANY, OF BRIDGEPORT, CONNECTICUT, A CORPORATION OF DELAWARE.

STOP MECHANISM.

Application filed May 28, 1918, Serial No. 237,053. Renewed June 26, 1922. Serial No. 570,932.

*To all whom it may concern:*

Be it known that I, JOHN J. SCULLY, a citizen of the United States of America, and a resident of Bridgeport, Connecticut, have invented a new and useful Improvement in Stop Mechanism, which invention is fully set forth in the following specification.

This invention relates to stop mechanism, and particularly to stop mechanism especially designed for use in talking machines.

In machines of the latter type, a sound-box, operatively connected to a sound-conveying member which together will be referred to as a traveling element, has movement relatively to a rotary record support, which support, or any other suitable motor-driven member, will be referred to as a rotating element, the sound-box and sound-conveying member generally being fed across the record support by the coaction of the former with the groove in the sound-record tablet. It is an object of this invention to provide a stop mechanism of improved construction which shall stop the rotation of the record support or other rotating element upon the completion of the traverse of the sound-box and sound-conveying member.

A further object of this invention is to provide stop mechanism of the character referred to with improved means whereby a predetermined number of revolutions of the rotating element must occur before said stop mechanism can come into action, whether the traveling element be stationary or not.

Other objects relate to the provision of a stop mechanism of the type in question which is simple in construction, inexpensive to manufacture and install, and efficient in operation.

Stated broadly, the invention comprises, in combination, a rotating element, a traveling element, stop mechanism, as a brake or switch, a member for actuating the same, shown as a rotating member, means operatively connected with the rotating element for moving said member into stop-actuating position and comprising a reciprocating member, and means operatively connected with the traveling element for preventing the movement of said member into stop-actuating position while the traveling element continues its traverse. Preferably a predetermined number of revolutions of the rotating element must occur before said actuating member comes into approximate stop-actuating position, said means operatively connected with the traveling element thereafter, and so long as the traveling element continues its traverse, preventing said actuating member from moving into final stop-actuating position.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

In said drawings:—

Fig. 2 is a perspective view of the more important elements of the stop mechanism; and Fig. 3 is a detail perspective of the outer end of the reciprocating member.

Figure 1:
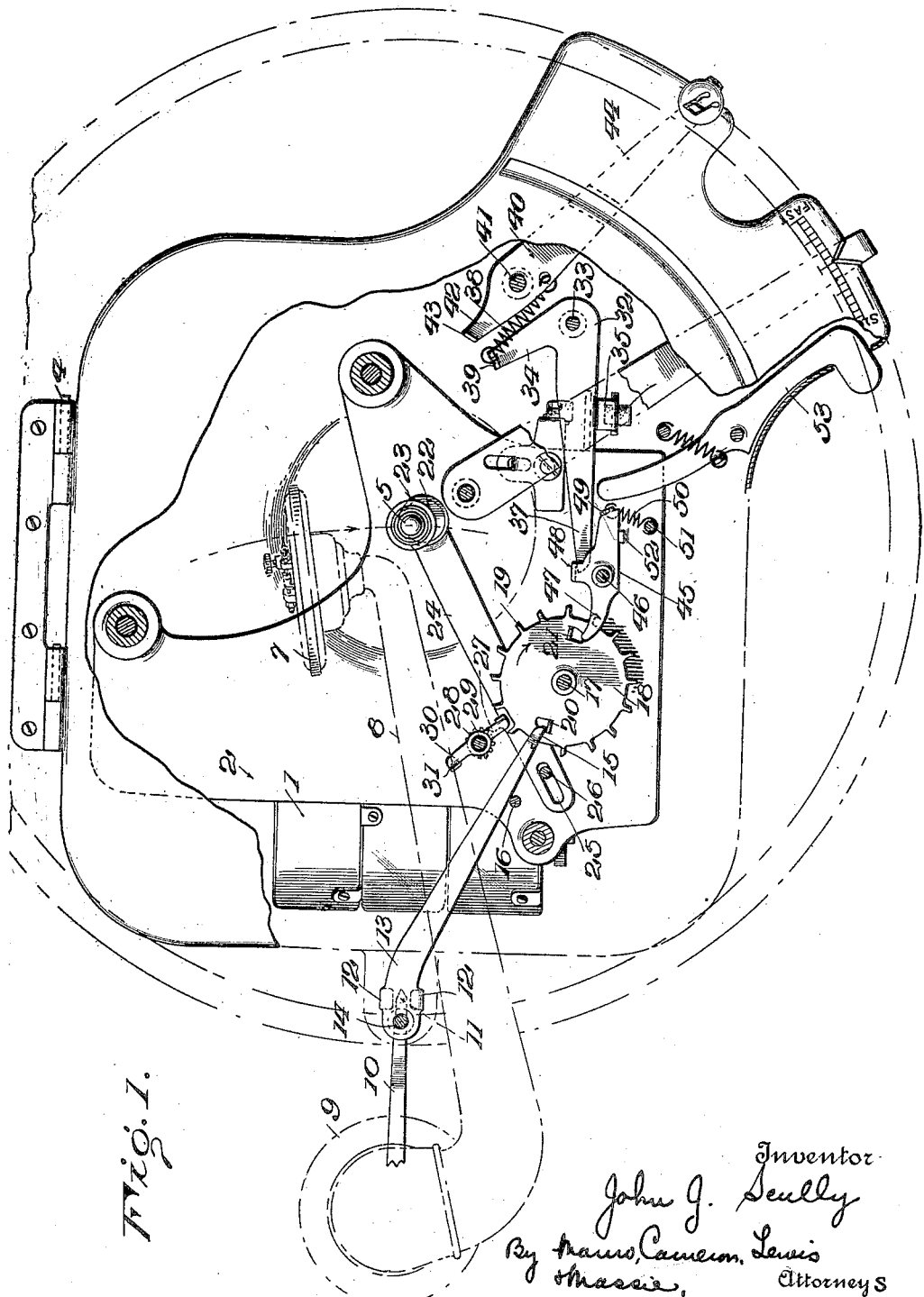
Fig. 1 is a top plan view of a talking machine provided with automatic stop mechanism in accordance with the present invention and showing the relation of the parts after a predetermined number of revolutions of the turn-table shaft and prior to the automatic actuation of the stop mechanism.

Referring in detail to said drawings, wherein the same reference characters designate corresponding parts in the several figures, 1 represents a driving motor of any suitable construction, shown as a spring-motor, 2 the motor-frame, 3 the motor-board, shown as hinged to the stationary part of the talking machine casing at 4, 5 the driving spindle of a rotary record support, shown in dot and dash lines at 6, and 7 the usual sound-box connected to a tone-arm 8, suitably mounted on the talking machine casing, as by a bracket 9, to enable the sound-box to traverse a record on said support. Said sound-box, tone-arm and bracket are also shown in dot-and-dash lines for the sake of clearness.

Frictionally connected to the tone-arm in any suitable way is an arm 10 provided at its outer end with an operating nose 11 which engages in a slot, shown as provided by a pair of bent-over ears 12, on a lever 13 pivoted to the motor-plate at 14 and provided at its opposite end with an operating nose 15. Said lever 13 may be limited in its movements in any suitable way as by a stop-pin 16 and a second pin of the same character, or, as shown, the hub of a two-arm rotary member to be described.

Rotatably mounted on the motor-board at 17 is an actuating member 18 shown as a gear provided with a plurality of radial teeth 19. Carried by said member 18 is a pair of diametrically disposed upstanding lugs 20 and 21, one or both of which are designed to coact with both the operating nose 15 of the lever 13 and a contact element of the stop mechanism to be described.

Means are provided for positively and intermittently rotating the member 18 from the motor of the machine. In the form shown, an eccentric 22 is mounted on the spindle 5 of the rotary record support 6 and engages in an eccentric strap 23 on a reciprocating member 24 provided adjacent its outer end with a slot 25 which receives a guide pin 26. Also carried by the reciprocating member 24 is a lateral nose or tooth 27 designed to engage and rotate a ratchet wheel 28 pivoted at 29 on the motor-board and carrying a pair of arms 30 provided with upstanding lugs 31 designed to engage the teeth 19 of member 18 and rotate the latter.

Suitable stop mechanism, which may be either a brake or a switch, designed to be actuated by the stop-actuating member 18 is suitably mounted on the motor-frame or motor-board. In the form shown, a brake lever 32 is pivotally mounted on the motor-board at 33 and provided with an operating arm 34, a depending arm 35 carrying a brake pad 36 designed to engage the usual brake disk of the talking machine governor, and a trip arm 37. A spring 38 connected at one end to an upstanding lug 39 on the operating arm 34 and at its other end to a starting lever 40 pivoted at 41 to the motor-board, normally urges the brake lever into stopping position. End 42 of lever 40 is provided with an upstanding lug 43 designed to engage operating arm 34 of brake lever 32 and move the latter into starting position, the opposite end 44 of said starting lever 40 extending through a suitable limiting slot to a point outside of the periphery of the motor-board 3 where it may be conveniently manipulated. It is to be expressly understood, however, that the invention is not limited to the use of a brake pad, as a switch might be operated by said lever 32, nor to the application of the brake pad to the governor disk, as by suitable variation said brake pad might engage other rotary members driven from the motor. Said stop mechanism also comprises a suitable contact element which, in the form shown, comprises a detent 45 pivoted to the motor-board at 46 and provided with a nose 47 in the path of rotation of one or both of the upstanding lugs 20 and 21, a depending ear 48 designed to engage the trip arm 37 of brake lever 32, and a lug 49 to which is connected one end of a spring 50, the opposite end of said spring being attached to a suitable pin 51. Spring 50 normally holds detent 45 in engagement with a stop pin 52 suitably mounted on the motor-board.

To start the machine, lever 40 is swung from the position shown in Fig. 1 to the right as far as is permitted by the limiting slot provided therefor in the motor-board and, during this movement, upstanding lug 43 engages operating arm 34 of lever 32 and moves said lever against the tension of spring 38 until trip arm 37 snaps back of the depending ear 48 on detent 45, whereupon spring 50 draws said detent against stop 52 maintaining brake lever 32 in starting position.

Brake element 36 being now withdrawn from engagement with the governor disk, the motor starts and rotates the spindle 5 and record support 6. Eccentric 22 moves member 24 both longitudinally and laterally. During outward movement of said member 24, during which time it is also moving pivotally to the right on pin 26, nose or tooth 27 passes by the ratchet wheel 28 without engaging the same. During inward movement of said member 24, during which time it is also moving pivotally to the left on pin 26, nose or tooth 27 engages one of the teeth on ratchet wheel 28 and rotates the latter in an anti-clockwise direction. In the form shown, ratchet wheel 28 is provided with eight teeth whereby said ratchet wheel will make one revolution for each eight revolutions of the spindle 5 of the rotary record support 6. At each half revolution of said ratchet wheel 28, one of the arms 30 engages its upstanding lug 31 with a tooth 19 of the rotary stop-actuating member 18 and advances the same through a distance equal to the pitch of said teeth 19. In order to advance the lugs 20 and 21 on said member 18 from their position when the machine is stopped into operative relationship with the nose 15 of lever 13 and nose 47 of detent 45, member 18 must make a half revolution. While said member 18 is making this one-half revolution, ample time is provided for the positioning of the sound-box in operative relation to the outer groove of the record tablet. Thus, assuming that member 18 has twenty teeth, it will require ten advancements thereof by the double-armed member 30 to move said member through one-half a revolution, and as an arm 30 is moved into engagement with a tooth of member 18 following each four revolutions of the spindle 5, it will take forty revolutions of said spindle to advance stop-actuating member 18 into coacting relationship with nose 15 and nose 47, i. e. into approximate stop-actuating position. It is to be expressly understood, however, that the invention is not restricted to the use of twenty teeth on the member 18, nor two arms on the member 30, nor eight teeth on the ratchet wheel 28; nor is it limited to the use of two upstanding lugs 20 and 21 on the member 18, as by a suitable selection of numbers, the lapse of time before member 18 moves into approximate stop-actuating position may be varied as desired.

The sound-box 7 having been operatively engaged with the sound-record tablet during the period when member 18 is making its half revolution, the sound-box and tone-arm now traverse the record and, through the frictional connection between the tone-arm and the arm 10, tend to drive said arm in a clockwise direction. Operating nose 11 on said arm 10, by engagement in the slot provided by ears 12 on the lever 13, also tends to drive said lever in a clockwise direction. The extent of movement of said arm and lever is, however, limited by the engagement of said lever with the stop 16. Thereafter and until member 18 has been advanced in a clockwise direction through its half revolution to approximate stop-actuating position, the arm 10 slips with respect to the tone-arm 8. When one of said lugs 20 and 21 is advanced into approximate stop-actuating position, it engages the operating nose 15 of lever 13 and moves said lever in an anti-clockwise direction, said lever moving arm 10 in an anti-clockwise direction, which movement is permitted by the frictional connection between said arm and the tone-arm. During the following interim when a lug 31 is not in engagement with a tooth 19 of member 18, arm 10, driven by the tone-arm through the frictional connection provided, moves the lever 13 in a clockwise direction and, through its engagement with the lug on the member 18, 20 in Fig. 1, rotates the latter in an anti-clockwise direction a distance equal to the pitch of the teeth. A lug 31 on an arm 30 then coming into engagement with a tooth on the member 18, the latter is moved in a clockwise direction an equal distance. Thereafter and so long as the traveling element continues its traverse, member 18 is subjected to the intermittently and alternately acting impulses of the lever 13 and a lug 31 on an arm 30, whereby it is made to oscillate in opposite directions through a limited arc. Throughout this period, the other of the two lugs 20 and 21, shown as 21 in Fig. 1, is in approximate stop-actuating position just out of engagement with nose 47 on detent 45. When the tone-arm ceases its traverse, lever 13 is no longer moved in a clockwise direction by arm 10 and therefore no longer subjects member 18 to an impulse for moving the same in an anti-clockwise direction. Said member, therefore, remains in the position to which it has been moved during the last engagement therewith of a lug 31 on an arm 30 and, upon the next engagement of a lug 31 with a tooth 19 on said member 18, the latter is advanced in a clockwise direction through a further distance to engage lug 21 with nose 47 of detent 45. Detent 45 is thereby swung about its pivot 46 against the tension of spring 50, withdrawing ear 48 from engagement with trip arm 37 of brake lever 32, whereupon spring 38 moves brake lever 32 into stopping position. During this movement of member 18 into final stop-actuating position, lug 20 moves lever 13 out of the way and moves past the same and, owing to the pivotal movement of detent 45, lug 21 may move past nose 47 of said detent. The parts are now in a position for again starting the machine, whereupon member 18 must make another half revolution before moving into operative relationship with lever 13 and detent 45, i. e., into approximate stop-actuating position.

Owing to the relation of end 11 of arm 10 with the slot provided by the ears 12 on lever 13, said lever may move out of operative engagement with said arm and with the motor about the pivot 4 when said motor and the parts of the stop mechanism mounted on the motor-board are moved upwardly for inspection. Upon return of the motor to normal position, lever 13 will resume its operative relationship with the end 11 of arm 10, without requiring manual connection or disconnection of the parts constituting the train of mechanism between the tone-arm and the stop-actuating member 18.

If it be desired to stop the machine prior to the automatic actuation of the stop-mechanism, a lever 53 may be provided as disclosed in the application of Frank C. Hinckley and myself, Serial No. 227,281, filed April 8, 1918.

While the embodiment illustrated on the drawings has been described with considerable particularity, it is to be expressly understood that the invention is not to be restricted thereto, as the same is capable of receiving a variety of mechanical expressions, some of which will readily suggest themselves to those skilled in the art, while certain parts thereof are capable of use without other parts thereof. Reference is therefore to be had to the claims hereto appended for a definition of the limits of the invention.

What is claimed is:—

1. In combination, a rotating element, a traveling element, stop mechanism, a member for actuating said stop mechanism, means operatively connected with the rotating element for advancing said actuating member into approximate stop-actuating position while said rotating element makes a predetermined number of revolutions, said means comprising a reciprocating member, and means operatively connected with the traveling element for preventing said actuating member from moving into final stop-actuating position while said traveling element continues its traverse.

2. In combination, a rotating element, a traveling element, stop mechanism, a member for actuating said stop mechanism, means operatively connected with the rotating element for advancing said actuating member into approximate stop-actuating position while said rotating element makes a predetermined number of revolutions, said means comprising a reciprocating member and a member rotated thereby and operatively related to said actuating member to advance the same, and means operatively connected with the traveling element for preventing said actuating member from moving into final stop-actuating position while said traveling element continues its traverse.

3. In combination, a rotating element, a traveling element, stop mechanism, a member for actuating said stop mechanism, means operatively connected with the rotating element for advancing said actuating member into approximate stop-actuating position while said rotating element makes a predetermined number of revolutions, said means comprising a reciprocating member and a member rotated thereby and adapted to intermittently rotate said actuating member, and means operatively connected with the traveling element for preventing said actuating member from moving into final stop-actuating position while said traveling element continues its traverse.

4. In combination, a rotating element, a traveling element, stop mechanism, a member for actuating said stop mechanism, means operatively connected with the traveling element for moving said actuating member in one direction, and means operatively connected with the rotating element for moving said actuating member in the opposite direction and comprising a reciprocating member, said actuating member becoming operatively related to said stop mechanism only after a predetermined number of revolutions of said rotating element.

5. In combination, a rotating element, a traveling element, stop mechanism, a member for actuating said stop mechanism, means operatively connected with the traveling element for moving said actuating member in one direction, and means operatively connected with the rotating element for moving said actuating member in the opposite direction, said last-named means comprising a reciprocating member and a member rotated thereby and operatively related to said actuating member to move the same, the aforesaid actuating member becoming operatively related to said stop mechanism only after a predetermined number of revolutions of said rotating element.

6. In combination, a rotating element, a traveling element, stop mechanism, a member for actuating said stop mechanism, means operatively connected with the traveling element for moving said actuating member in one direction, and means operatively connected with the rotating element for moving said actuating member in the opposite direction, said last-named means comprising a reciprocating member and a member rotated thereby and adapted to intermittently rotate said actuating member, said actuating member becoming operatively related to said stop mechanism only after a predetermined number of revolutions of said rotating element.

7. In combination, a rotating element, a traveling element, stop mechanism, a member for actuating said stop mechanism, means operatively connected with the rotating element for moving said member into approximate stop-actuating position, said last-named means comprising a reciprocating member, and means operatively connected with the traveling element for preventing said actuating member from moving into final stop-actuating position while the traveling element continues its traverse.

8. In combination, a rotating element, a traveling element, stop mechanism, a member for actuating said stop mechanism, means operatively connected with the rotating element for moving said member into approximate stop-actuating position, said last-named means comprising a reciprocating member and a member rotated thereby and operatively related to said actuating member to move the same, and means operatively connected with the traveling element for preventing said actuating member from moving into final stop-actuating position while the traveling element continues its traverse.

9. In combination, a rotating element, a traveling element, stop mechanism, a member for actuating said stop mechanism, means operatively connected with the rotating element for moving said member into approximate stop-actuating position, said last-named means comprising a reciprocating member and a member rotated thereby and adapted to intermittently rotate said actuating member, and means operatively connected with the traveling element for preventing said actuating member from moving into final stop-actuating position while the traveling element continues its traverse.

10. In combination, a rotating element, a traveling element, stop mechanism, a member for actuating said stop mechanism, means operatively connected with the rotating element for moving said member into approximate stop-actuating position, said last-named means comprising a reciprocating member, a member rotated thereby and arms on said rotating member adapted to intermittently engage and move said actuating member and means operatively connected with the traveling element for preventing said actuating member from moving into final stop-actuating position while the traveling element continues its traverse.

11. In combination, a rotating element, a traveling element, stop mechanism, a member for actuating said stop mechanism, means operatively connected with the rotating element for moving said member into approximate stop-actuating position, said last-named means comprising a reciprocating member, an eccentric for reciprocating the same and a member moved by said reciprocating member and operatively related to said actuating member to move the same, and means operatively connected with the traveling element for perventing said actuating member from moving into final stop-actuating position while the traveling element continues its traverse.

12. In combination, a rotating element, a traveling element, stop mechanism, a member for actuating said stop mechanism, means operatively connected with the rotating element for moving said actuating member into approximate stop-actuating position, said last-named means comprising a reciprocating member, and means operatively connected with the traveling element for moving said actuating member out of approximate stop-actuating position so long as said traveling element continues its traverse.

13. In combination, a rotating element, a traveling element, stop mechanism, a member for actuating said stop mechanism, a reciprocating member operatively connected with the rotating element for moving said actuating member in one direction, and means operatively connected with the traveling element for moving said actuating member in the opposite direction.

14. In combination, a rotating element, a traveling element, stop mechanism, a member for actuating said stop mechanism, a reciprocating member operatively connected with the rotating element for intermittently moving said actuating member in one direction, and means operatively connected with the traveling element for intermittently moving said actuating member in the opposite direction so long as the traveling element continues its traverse.

15. In combination, a rotating element, a traveling element, stop mechanism comprising a contact element, a member adapted to engage said contact element and actuate said stop mechanism, means operatively connected with the traveling element for moving said member in one direction, and a reciprocating member operatively connected with the rotating element for moving said member in the opposite direction and operable upon the stopping of the traveling element to move said member into engagement with said contact element.

16. In combination, a rotating element, a traveling element, means cooperatively related to said rotating and traveling elements to stop the rotating element upon stopping of the traveling element, and reciprocating means operatively connected to said rotating element for actuating said stopping means.

17. In combination, a rotating element, a traveling element, stop means, reciprocating means driven by the rotating element for actuating said stop means, and means cooperating with the traveling element adapted to prevent such actuation during the travel of the traveling element.

In testimony whereof I have signed this specification.

JOHN J. SCULLY.